US006092337A

United States Patent [19]

Johnson et al.

[11] Patent Number: 6,092,337

[45] Date of Patent: Jul. 25, 2000

[54] VEHICLE LIFTGATE POWER OPERATING SYSTEM

[75] Inventors: Joseph Michael Johnson, Huntington Woods; Joseph D. Cranston, Troy, both of Mich.

[73] Assignee: Delphi Technologies Inc., Troy, Mich.

[21] Appl. No.: 09/245,629

[22] Filed: Feb. 5, 1999

[51] Int. Cl.[7] .............................. E05F 11/24; B62D 25/00

[52] U.S. Cl. .......................... 49/340; 296/56; 296/148.8; 74/424

[58] Field of Search .............................. 49/333, 334, 335, 49/336, 339, 340, 341, 342, 348, 349, 350; 296/146.11, 146.8, 56, 202; 74/540, 89.18, 424.6, 424

[56] References Cited

U.S. PATENT DOCUMENTS

| | | | |
|---|---|---|---|
| 4,165,583 | 8/1979 | Meyer | 49/349 |
| 4,541,293 | 9/1985 | Caugant et al. | 74/89.18 |
| 4,850,140 | 7/1989 | Compeau et al. | 49/26 |
| 5,209,057 | 5/1993 | Remlaoui | 74/89.18 |
| 5,448,856 | 9/1995 | Moore et al. | 49/340 |
| 5,563,483 | 10/1996 | Kowall et al. | 49/26 |
| 5,851,050 | 12/1998 | Squire et al. | 296/146.8 |
| 5,921,611 | 7/1999 | Townsend | 296/146.8 |

*Primary Examiner*—Daniel P. Stodola
*Assistant Examiner*—Curtis A. Cohen
*Attorney, Agent, or Firm*—Kathryn A. Marra

[57] ABSTRACT

A power operating system for opening and closing a vehicle liftgate has a pair of drive units supported on the vehicle roof and connected to the liftgate for opening and closing the liftgate. Each drive unit includes a bracket that is secured to the vehicle body for supporting several parts including a reversible electric motor, a gear unit and a track. The electric motor drives a segmented sector inside the track via a gear reduction unit. The segmented sector includes an arcuate link that slides in an arcuate track portion of the track and a plurality of short sector links that are stored in a storage track portion when the liftgate is closed. The arcuate link has an outboard end that is pivotally connected to the liftgate to open and close the liftgate as the arcuate link is extended and retracted by the segmented rack.

12 Claims, 2 Drawing Sheets

VEHICLE LIFTGATE POWER OPERATING SYSTEM

TECHNICAL FIELD

This invention relates to a power operating system for a vehicle liftgate that is pivotally attached to a vehicle compartment for pivotal movement about a generally horizontal axis and more particularly to a power operating system that will move a liftgate from a closed position to a fully open position and from an open position to a fully closed position.

BACKGROUND OF THE INVENTION

Utility vehicles and vans with liftgates that are hinged at the top about a generally horizontal axis arc used by large numbers of people today. Some of these liftgates are large and heavy. Their size and weight make some liftgates difficult to open and close. Some of the liftgates are also a great distance above the ground when they are fully opened. Their height above the ground makes them very difficult for some people to close. For these and other reasons many people would like to have a power operating system for opening and closing the liftgate.

A number of different liftgate openers have been tried in recent years. Some of these liftgate openers have a single cable that opens and closes a liftgate in connection with a counterbalance system, such as gas cylinders. Liftgates with a single cable opener and closer are generally trunk lids that are lightweight and have a relatively small range of movement.

Gas cylinder output varies with temperature. This complicates power liftgate systems that rely on gas cylinders to open the liftgate. The gas cylinder or cylinders must be strong enough to open the liftgate on the coldest date (−40° C.). This results in gas cylinders that increase closing resistance substantially on the hottest day (80° C.). Therefore a very large electric motor must be used to close the liftgate.

Liftgates that have two or more gas cylinders for a counter balance system are common. These gas cylinders generally occupy a position in which their axis is substantially parallel to the liftgate so that the gas cylinders are hidden when the liftgate is closed. In this closed position the moment arm of the gas cylinders is quite small. With such systems the lift gate may move about one-third of their total travel range before the gas cylinders exert sufficient force to open a liftgate further without the application of an independent lifting force. There are even some systems in which the gas cylinders pass over center and bias a liftgate toward a closed position when the liftgate is closed. With these self closing systems a liftgate may need to be more than one-third open before the gas cylinders will open the liftgate further.

The force required to hold a liftgate in a given position along its path of movement from a closed position to a fully open position varies substantially in some liftgate opening systems. A power liftgate closer must exert sufficient force to hold a liftgate in any given position along the path of movement, plus the force to overcome friction, and plus the force required to accelerate the liftgate during liftgate closing. If the total force exerted by the liftgate power closure varies substantially from one position between fully opened and closed to another position between fully opened and closed, it may be difficult for the control system to detect an obstruction and stop the liftgate without incurring damage to the vehicle or to the object that obstructs the liftgate.

SUMMARY OF THE INVENTION

The object of the invention is to provide an improved vehicle liftgate power operating system.

A feature of the invention is that the vehicle liftgate power operating system can move the liftgate from a closed position to a fully opened position as well as from an open position to a fully closed position.

Another feature of the invention is that the liftgate power operating system allows the liftgate to be moved manually when an efficient gear train is selected.

Another feature of the invention is that power operating system can be stopped at any point to hold the liftgate in any intermediate position without any need for a brake, detent or the like.

Still another feature of the invention is that the drive unit of the liftgate power operating system has a moveable link attached to the liftgate that is guided by a track that can be shaped to hug the interior roof structure and consequently maximize the unobstructed load height at the liftgate opening.

Yet another feature of the invention is that the liftgate power operating system has a moveable link attached to the liftgate that is driven by a segmented sector that can be stored close to the interior roof of the vehicle and thus minimize intrusion into the cargo area of the vehicle and into the unobstructed load height at the liftgate opening.

Still yet another feature of the invention is that the liftgate power operating system has a moveable link attached to the liftgate that can be shaped and guided to move concentrically with respect to the pivot axis of the liftgate so that the moveable link can be sealed easily. This also allows the exit for the moveable link to be located outside the liftgate perimeter seal.

Still yet another feature of the invention is that the power operating system can be used in conjunction with a counterbalance system for a manual operating system with any modification in the counterbalance system.

These and other objects, features and advantages of the invention will become more apparent from the following description of a preferred embodiment taken in conjunction with the accompanying drawing.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENT

Figure 1:
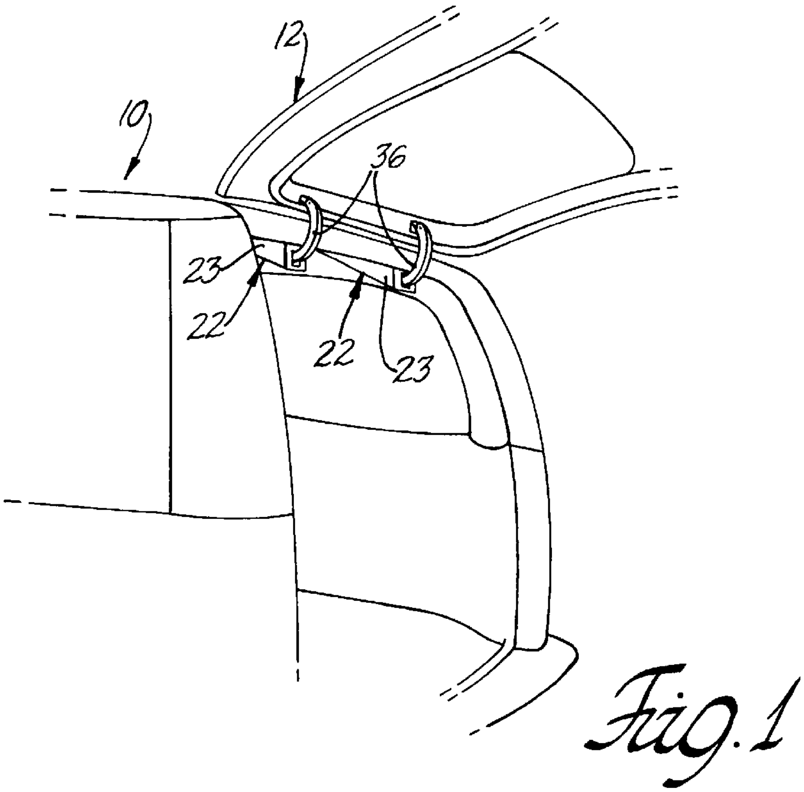
FIG. 1 is a perspective view of the rear portion of a vehicle equipped with a liftgate power operating system of the invention showing the liftgate in an open position.
Figure 2:
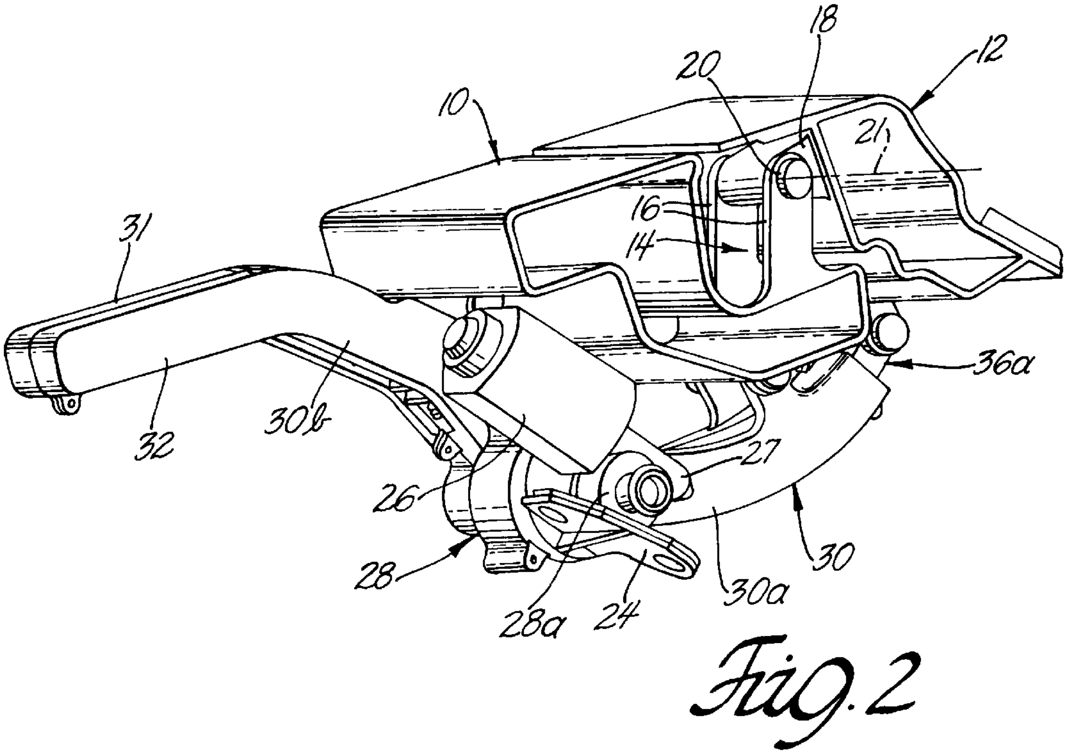
FIG. 2 is an enlarged perspective view of the right hand drive unit of the power operating system of FIG. 1 showing the drive unit when the liftgate is closed.
Figure 3:
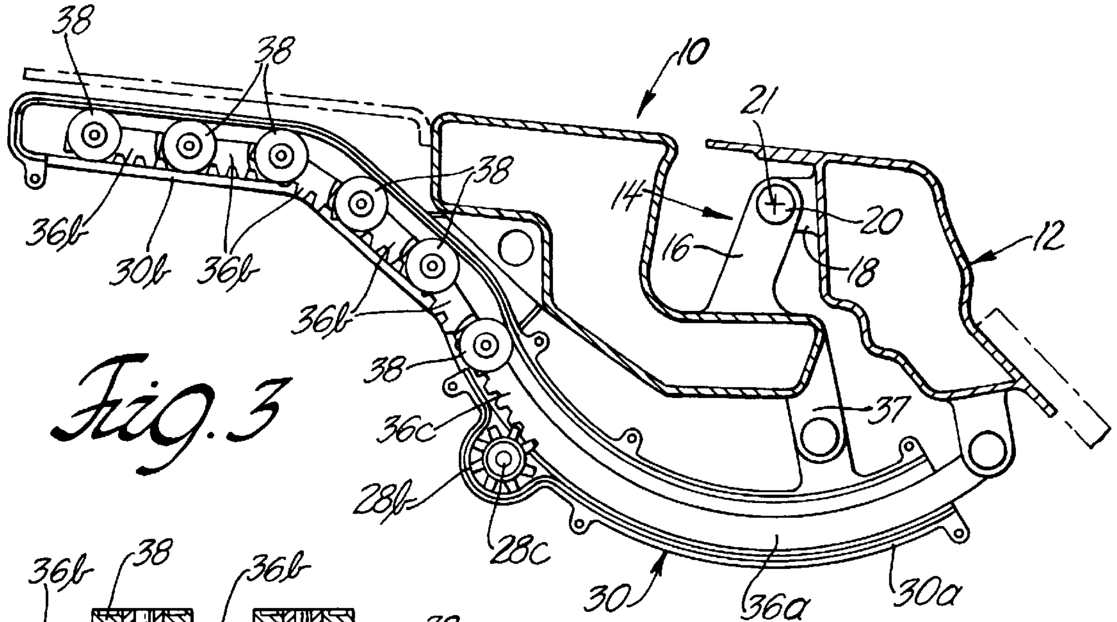
FIG. 3 is an enlarged side view of the right hand drive unit shown in FIG. 2 with parts removed to show internal detail.
Figure 5:
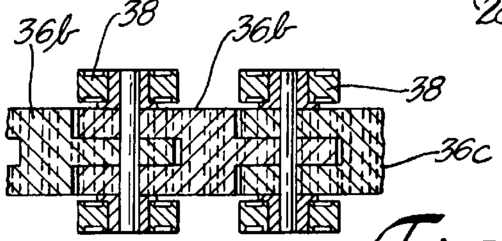
FIG. 5 is a section taken substantially along the line 5—5 of FIG. 4 looking in the direction of the arrows.
Figure 4:
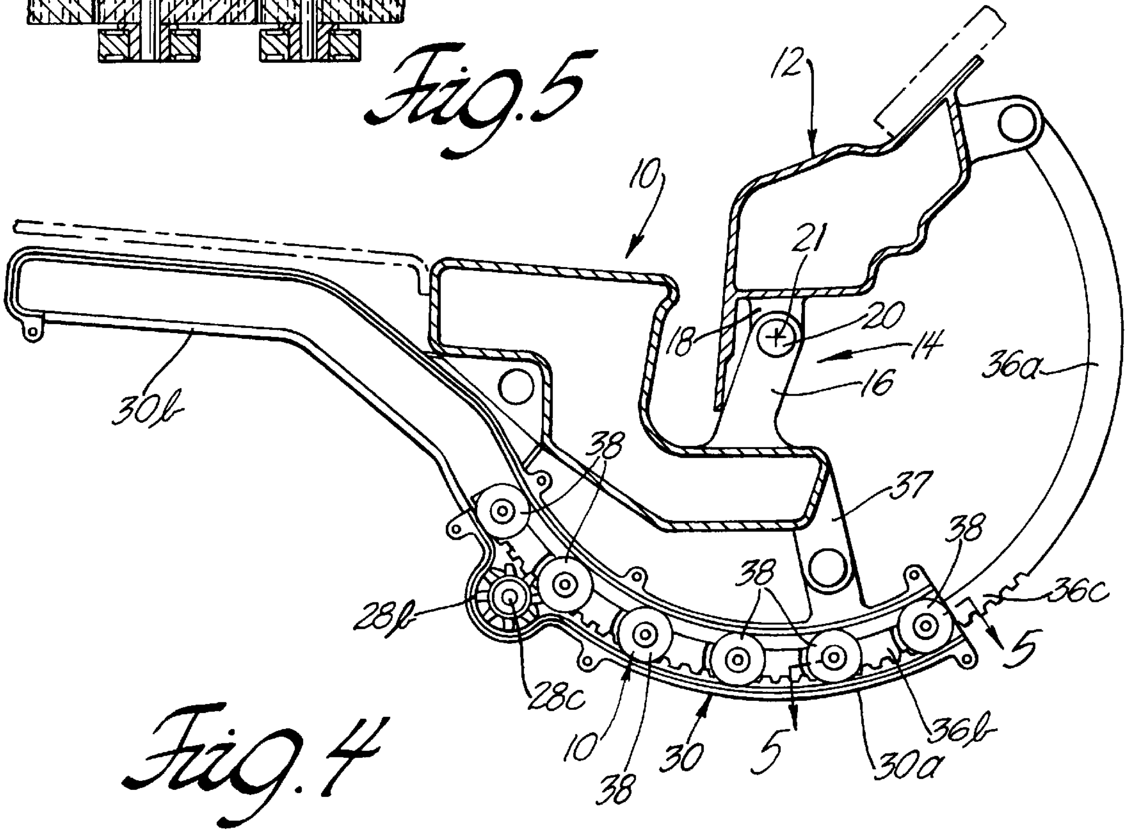
FIG. 4 is an enlarged side view of the right hand drive unit shown in FIG. 2 with parts removed to show internal detail when the liftgate is in the open position.

Vehicle 10 has a liftgate 12 that is attached to the aft end of the vehicle roof by two hinge assemblies. The typical right hand hinge assembly 14 is shown in FIGS. 2, 3 and 4. Hinge assemblies 14 have hinge portions 16 that arc secured to a roof channel of the vehicle 10 and hinge portions 18 that are secured to a top channel the liftgate 12. Hinge portions 18 are attached to hinge portions 16 by pivot pins 20 so that liftgate 12 pivots about a pivot axis indicated at 21 in FIGS. 2, 3 and 4 from a closed position shown in FIGS. 2 and 3 to a raised open position shown in FIGS. 1 and 4. Pivot axis 21 is generally substantially horizontal and liftgate 12 is generally permitted to pivot about 90° about pivot axis 21. However, the range of movement can be varied substantially from one vehicle 10 to another.

Lift gate 12 is opened and closed by a power operating system that includes two identical drive units 22 that are installed in the aft end of the vehicle roof. Drive units 22 are laterally spaced from each other and near the respective vertical body pillars at the aft end of vehicle 10 that define the rear opening that is closed by lift gate 12. The typical drive unit 22 is shown in FIGS. 2, 3 and 4 with the interior trim cover 23 removed to show detail of the drive unit.

Each drive unit 22 comprises a bracket 24 that is secured to the vehicle body in a fixed position for supporting several parts including a reversible electric motor 26, a gear reduction unit 28, and a two piece track 30 comprising a track base 31 and a track cover 32. Electric motor 26 has a worm gear output 27 that drives a pinion gear 28*a* of the gear reduction unit 28. Pinion gear 28*a* drives output gear 28*b* via a splined stub shaft 28*c* to provide speed reduction and torque multiplication.

The two piece track 30 includes a rearward track portion 30*a* and a contiguous forward track portion 30*b* that are secured to the vehicle body in a fixed position. Bracket 24 attaches the inboard end of rearward track portion 30*a* via the housing for gear unit 28 while hanger 37 attaches the aft end of track 30.

Rearward track portion 30*a* is preferably shaped to hug the aft end of the vehicle roof, particularly the box beam that carries the hinge portions 16 as best shown in FIGS. 2, 3 and 4, in order to maximize unobstructed load height at the liftgate opening. Track portion 30*a* is also preferably arcuately shaped with a radius of curvature that is centered on the hinge axis 21 of lift gate 12. Forward track portion 30*b* preferably is above the arcurate rearward tract portion 30*a* and turns in an opposite direction resulting in a wave like configuration for track 30 that follows the interior contour of the vehicle roof closely. This wave like configuration and close spacing reduces space requirements and minimizes intrusion into the cargo compartment particularly in the vertical direction.

A segmented sector 36 is disposed in track 30. Segmented sector 36 comprises an elongated link 36*a* and a plurality of short links 36*b* that are pivotally connected end-to-end in chain-like fashion. Link 36*a* is also preferably arcuately shaped with a curvature that matches that of track portion 30*a* so that link 36*a* slides back and forth in track portion 30*a* pivoting about axis 21 between the retracted position shown in FIGS. 2 and 3 and the extended position shown in FIGS. 1 and 4. This concentric path of movement eliminates pivotal movement of link 36*a* wit respect to liftgate 12 and consequently link 36*a* can be sealed at the vehicle body exit easily and the body exit for link 36*a* can even be placed in the vertical body pillar outside the liftgate perimeter seal (not shown).

Sector links 36*b* are stored in forward track portion 36*b* when liftgate 12 is closed as shown in FIG. 3 and then travel into the rearward arcuate portion portion 30*a* when liftgate 12 is opened as shown in FIG. 4. Consequently, sector links 36*b* are preferably made as short curved links to facilitate travel in the wave like track 30.

The inboard end of link 36*a* preferably includes an integral sector link 36*c* that is pivotally connected to the outboard end of the first short sector link 36*b*. The outboard end of arcuate link 36*a* is pivotally connected to liftgate 12. Integral rack link 36*c* provides better control in starting and stopping movement of arcuate link 36*a*. The inboard end of arcuate link 36 may carry a roller 38 at the pivotal connection with the first short sector link 36*b* to facilitate sliding movement in track 30. The inboard ends of the remaining sector links 36*b* may also carry rollers 38 at their respective pivotal connections to facilitate sliding movement in track 30.

The power operating system further includes a conventional power source such as the vehicle battery (not shown) and a suitable motor control for energizing and shutting off the reversible electric motor 26. Motor controls are well known to those skilled in the art and thus need not be described in detail.

The power operating system operates as follows. Assuming that the liftgate 12 is closed as shown in FIGS. 2 and 3, electric motor 26 is energized to open liftgate 12. When energized, electric motor 26 rotates pinion gear 28*a* counterclockwise. Pinion gear 28*a* in turn rotates output gear 28*b* counterclockwise is driving integral sector link 36*c* and then the plurality of sector links 36*b* in succession until arcuate link 36*a* is driven from the retracted position shown in FIGS. 2 and 3 to the extended position shown in FIGS. 1 and 4. This raises liftgate 12 from the closed position shown in FIGS. 2 and 3 to the raised open position shown in FIGS. 1 and 4. When the liftgate 12 is frilly opened, a limit switch or the like is actuated to shut off electric motor 26. Liftgate 12 is closed by reversing electric motor 26 so that gear unit 28 drives segmented sector 36 back to the retracted position shown in FIGS. 2 and 3.

With a proper motor control circuit, electric motor 26 can be de-energized at any time in which case liftgate 12 can be stopped at any intermediate position and held in the intermediate position by the friction in gear train 28 without any need for a brake, detent or the like. The liftgate 12 can then be moved by energizing electric motor 26 or the liftgate 12 can then be moved manually because gear train 28 can be designed with sufficient efficiency to permit back drive to electric motor 26.

The power operating system can be designed to work alone or in conjunction with gas cylinders 40 which are well known in the art with the primary adjustment being the size of the electric motor 26.

The power operating system described above preferably includes two identical drive units 22 for balanced operation and reduced manufacturing costs. However, the drive units need not be identical and in some instances, a single drive unit may be sufficient.

It is also possible to use two drive units with a single reversible electric motor driving both gear trains 28. In such an arrangement the axis of the electric motor is parallel to the axis of the several gears of gear train 28 thereby eliminating the need for a cross axis gear arrangement and possible need for a clutch in order to back drive the electric motor and thus operate the liftgate manually. The same is true with a power operating system having two identical drive units where the axes of the individual electric motors 26 are parallel to the axes of the respective drive trains.

Obviously, many modifications and variations of the present invention in light of the above teachings may be made. It is, therefore, to be understood that, within the scope of the appended claims, the invention may be practiced otherwise than as specifically described.

We claim:

1. A power operating system that opens and closes a vehicle liftgate for pivotal attachment to an aft end of a vehicle roof for pivotal movement between an open position and a closed position about a generally horizontal axis comprising:

at least one drive unit that includes a reversible electric motor, a segmented sector driven by the electric motor, and a track, the segmented sector having a plurality of links including one link that slides in the track, the one link being pivotally attached to the vehicle liftgate at one end and to another link of the segmented sector at the other end.

2. The power operating system as defined in claim 1 wherein the drive unit includes a gear train between the electric motor and the segmented sector and wherein the gear train has sufficient friction to hold the vehicle liftgate in an intermediate position without any need for a holding device.

3. The power operating system as defined in claim 2 wherein the gear train enables manual movement of the vehicle liftgate away from the intermediate position.

4. The power operating system as defined in claim 1 wherein the vehicle liftgate exposes a liftgate opening in an open position, wherein the power operating system is attachable to an adjacent aft end of a vehicle roof and wherein the track is shaped to hug the aft end of the vehicle roof to increase unobstructed load height at the liftgate opening when the vehicle liftgate is in an open position.

5. The power operating system as defined in claim 1 wherein the vehicle liftgate pivots about a hinge axis, the track has an rearward portion that is arcuately shaped with a radius of curvature that is centered on the hinge axis and the one link is also arcuately shaped with a curvature that matches that of the track so that the link slides back and forth in the track pivoting about the hinge axis.

6. The power operating system as defined in claim 5 wherein the track has a wave shaped configuration and includes a forward portion for storing at least a portion of the segmented sector when the vehicle liftgate is in the closed position.

7. A power operating system that opens and closes a vehicle liftgate for pivotal attachment to an aft end of a vehicle roof for pivotal movement between an open position and a closed position about a generally horizontal axis comprising:

at least one drive unit that includes a reversible electric motor, a segmented sector driven by the electric motor and a track, the segmented sector having a plurality of links including one link that slides in the track, the one link being pivotally attached to the vehicle liftgate at one end and to a second link of the segmented sector at the other end, the vehicle liftgate pivoting about a hinge axis, the track having a rearward portion that is arcuately shaped with a radius of curvature that is centered on the hinge axis, and the one link being arcuately shaped with a curvature that matches that of the rearward the track so that the one link slides back and forth in the rearward portion of the track pivoting about the hinge axis, the track having a wave-like configuration and including a forward portion for storing at least a portion of the segmented sector when the vehicle liftgate is in the closed position, and the segmented sector having a plurality of sector links including the second link, the one link having an integral sector link at an inboard end and wherein the sector links are pivotally connected end to end in chain-like fashion.

8. A power operating system that opens and closes a vehicle liftgate comprising:

a vehicle frame and an access opening;

the vehicle liftgate pivotally attached to the vehicle frame adjacent to a top of the access opening for pivotal movement about a generally horizontal pivot axis;

a drive unit supported on the frame and connected to the vehicle liftgate for opening and closing the vehicle liftgate, the drive unit including a reversible electric motor, a gear unit and a track, the track including a rearward arcuate track portion that is fixed to the vehicle body and a forward storage track portion, an arcuate link that slides in the arcuate track portion and a segmented sector disposed in the track comprising a plurality of short sector links and the arcuate link, the arcuate link having an inboard end that is pivotally connected to an end of one of the short sector links of the segmented sector and an outboard end that is connected to the vehicle liftgate, and the electric motor having a gear output that drives the segmented sector via the gear unit.

9. The power operating system as defined in claim 8 wherein the vehicle liftgate exposes the access opening in an open position, wherein the power operating unit is adjacent an aft end of a vehicle roof, and wherein the track has a wave-like configuration and is shaped to hug the aft end of the vehicle roof to increase unobstructed load height at the liftgate opening when the vehicle liftgate is in an open position.

10. The power operating system as defined in claim 9 wherein the rearward arcuate track portion has a radius of curvature that is centered on the generally horizontal pivot axis and the arcuate link is also arcuately shaped with a curvature that matches that of the rearward arcuate track portion so that the arcuate link slides back and forth in the rearward arcuate track portion pivoting about the generally horizontal pivot axis.

11. The power operating system as defined in claim 10 wherein the forward storage track portion stores at least a portion of the segmented sector when the liftgate is in the closed position.

12. The power operating system as defined in claim 11 wherein the arcuate link has one of the plurality of short sector links integrally attached at an inboard end and wherein the plurality of short sector links are pivotally connected end to end in chain-like fashion.

* * * * *